United States Patent Office 3,112,326
Patented Nov. 26, 1963

3,112,326
POLYARYLMETHANE HYDRAZINIUM
COMPOUNDS
Bernard Rudner, Pittsburgh, and Charles W. Wieneke,
Lancaster, Pa., assignors to W. R. Grace & Co., New
York, N.Y., a corporation of Connecticut
No Drawing. Filed June 19, 1959, Ser. No. 821,390
4 Claims. (Cl. 260—391)

This invention relates to polyarylmethane compounds. In one specific aspect, it relates to salts which may be described as di- and triarylmethane hydrazinium compounds.

Probably the best known polyarylmethane compounds are the triphenylmethane dyes, e.g., Malachite Green, Crystal Violet, the Victoria Blues, Wool Green, the Patent Blues and the Brilliant Indocyanines. These compounds are best known for the intensity and brilliance of the color they bestow on fibers and the strength of shade their lakes and toners possess. The simple representative triphenylmethane dyes are frequently made by condensing an aromatic aldehyde, such as benzaldehyde, with an aromatic amine to form the leuco base. Subsequent oxidation of the colorless base in an acid medium, suitably with lead dioxide or manganese dioxide, yields the dye.

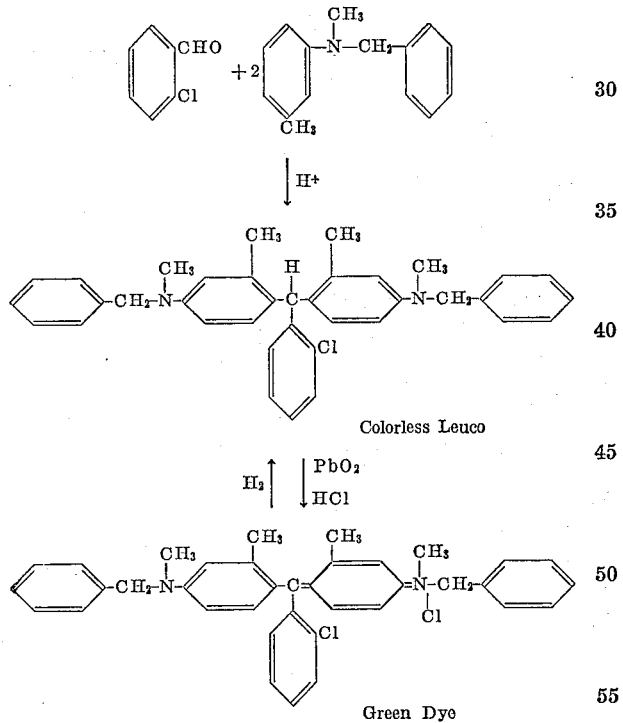

Colorless Leuco

Green Dye

Treatment of a basic triphenylmethane dye (one containing no carboxy, sulfonic or other acidic groups) with at least the theoretical amount of base converts it reversibly to its colorless carbinol form.

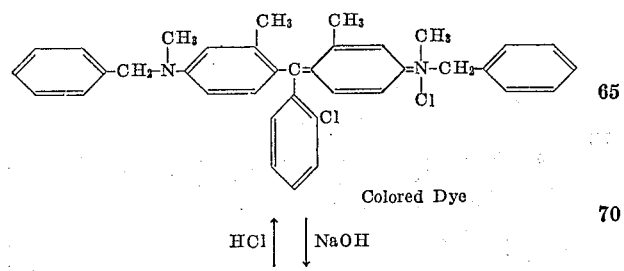

Colored Dye

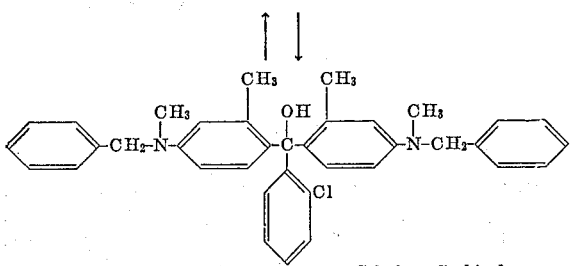

Colorless Carbinol or Colored Base

Acid triphenylmethane dyes are, of course, more resistant to alkaline decolorization since the acid groups present can react with base, in equivalent amounts, preserving the dye structure.

Michler's base, Michler's hydrol and Michler's ketone have all been used to make dyes of the type utilized herein.

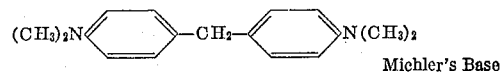

Michler's Base

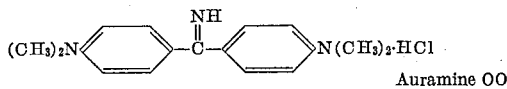

Auramine OO

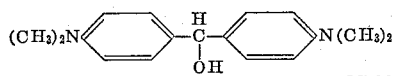

Michler's Hydrol

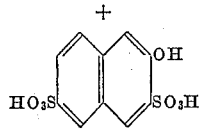

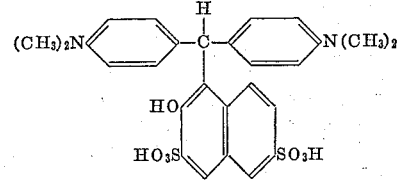

Leuco Green S

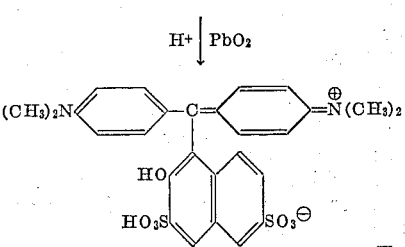

Wool Green S

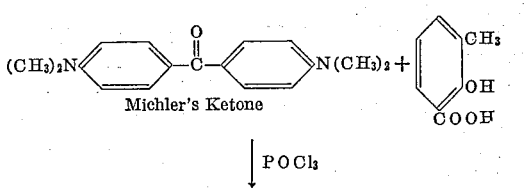

Michler's Ketone

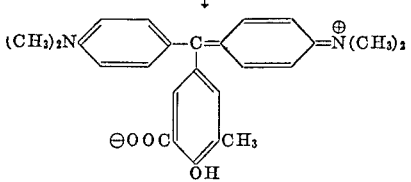

Monochrome

We have discovered certain novel polyarylmethane hydrazinium salts possessing remarkable fungicidal and bacteriocidal properties. These novel salts are most conveniently prepared by the action of chloramine or hydroxylamine-o-sulfonic acid on tertiary-amino containing polyarylmethane compounds.

It is, therefore, an object of the present invention to provide a new generic class of di- and triphenylmethane compounds useful as fungicidal and bacteriocidal agents.

The novel hydrazinium compounds of our invention have the general formula:

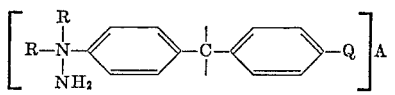

The remaining two valences of the central carbon atom are satisfied by $=H_2$, $-H$ and $-OH$, $=O$, $=NH$, $-H$ and

—OH and

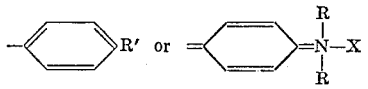

Q may be NRR or N(NH$_2$)RR, each R in the above structure may be lower alkyl or benzyl and R' may be H, OH or NRR. The phenylene groups in the above formulae may bear the usual substituents found on benzene rings, i.e. halo, alkyl, sulfonic acid, carboxylic acid etc. Since the primary utility of these compounds resides in the cationic portion of the molecule, we do not wish to be bound by any arbitrary limitations on the nature of the anions A and X save that the number of cations present must balance the anionic charge.

Our compounds can be made by the N-amination of the leuco base, the color base or the dye proper. The same interconversions among the leuco and color bases and the dye itself characteristic of the triphenylmethane dye series are undergone by their hydrazinium counterparts. Thus it is possible to N-aminate the most readily available or chemically convenient species and convert it to the desired species as necessary. N-amination is most conveniently accomplished by the action of chloramine or hydroxylamine-o-sulfonic acid on a tertiary amine as shown in the examples that follow. Since the reaction of chloramine with a tertiary-amino-containing polyarylmethane compound yields the corresponding hydrazinium chloride and similarly the reaction of hydroxylamine-o-sulfonic acid gives the corresponding hydrazinium sulfate and bisulfate, metathesis is necessary to substitute another anion for the chloride or sulfate ions. Such a substitution can be readily accomplished by standard techniques and broadens the utility spectrum of our novel compounds.

The compositions of this invention are useful as antioxidants and as powerful biocides particularly as bacteriocides and fungicides. Our novel compounds are also useful as biocidal and bacteriological stains and as basic dye-stuffs and dye-stuff intermediates.

The scope and utility of our invention is further illustrated by the following examples:

EXAMPLE I

A chloramine-ammonia generator was constructed according to the teachings of Sisler et al., U.S. Patent 2,710,248, discussed above. Using such a generator, chloramine was passed into a solution of 25 g. of leuco Crystal Violet in 1000 ml. of chloroform for about a half hour. After filtration from the resultant ammonium chloride, the filtrate was evaporated to dryness leaving a residue weighing 29.9 g. The unreacted amine was extracted with methyl alcohol leaving 20 g. of 1,1-dimethyl-1-[4-(p,p'-tetramethyldiaminobenzhydryl)phenyl]hydrazinium chloride melting 160–163° C. and containing 8.01% chloride ion or 96.5% pure. The preparative sequence is shown below:

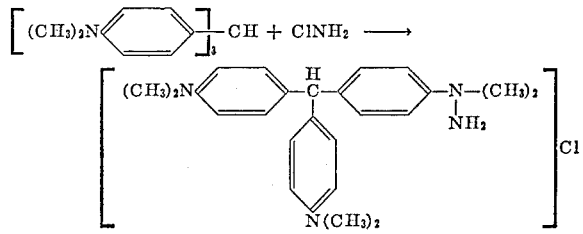

Treatment of small portions of the product with saturated aqueous solutions of picric acid and potassium hexafluorophosphate gave the corresponding hydrazinium picrate (M.P. 108–112° C.) and hexafluorophosphate (M.P. ca. 130°) respectively.

EXAMPLE II

Using the generator of Example I, excess chloramine was passed into a solution of 50 g. of Crystal Violet dissolved in chloroform. After the reaction had been completed, filtration gave 29 g. of solid and 37 g. additional solid was obtained by evaporation of the filtrate. Each residue was extracted with isopropyl alcohol to separate the product from the ammonium chloride present. Combination of the new residues obtained from the alcohol extracts gave 30 g. of 1,1-dimethyl-1-[4-(alpha-hydroxy-p,p'-tetramethyldiaminobenzhydryl)phenyl]hydrazinium chloride (the color base) melting 160–164° C. The pure product analyzed: 66.98% C, 7.71% H, 12.86% N and 8.35% Cl. Calculated for $C_{25}H_{33}ClN_4O$: 67.20% C, 7.75% H, 13.06% N and 8.26% Cl. Treatment of the color base with an equivalent amount of hydrochloric acid converted it to the dye proper, 1,1-dimethyl-1-[4-((alpha - (quinone - p - dimethylimonium) - 4 - dimethylaminobenzyl))phenyl]-hydrazinium dichloride, as shown

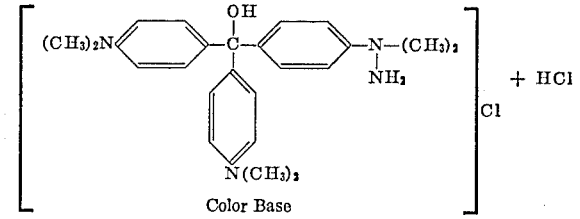

Color Base

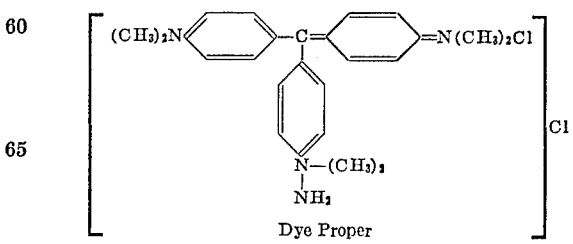

Dye Proper

EXAMPLE III

A solution of 25 g. of p-hydroxybenzylidene-bis-(p,p'-dimethylaniline) dissolved in one liter of chloroform was treated with gaseous chloramine made from 12 g. of chlorine according to the general method of Example I. After removal of most of the ammonium chloride by filtration, evaporation of the solvent gave 22.9 g. of residue from which 15 g. of unreacted amine was recovered. The 7.9 g. of crude product remaining was separated from about 1.0 of ammonium chloride present by fractional crystallization from methyl alcohol-ethyl acetate. Further trituration with ethyl acetate gave 4.5 g. of 1,1-dimethyl - 1 - [4 - (p - hydroxy-p'-dimethylaminobenzhydryl)phenyl]hydrazinium chloride melting with decomposition ca. 172° C. and having the following structure:

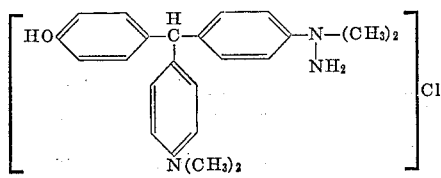

EXAMPLE IV

Using a generator constructed according to Example I, a solution of 50 g. of Auramine dissolved in chloroform was treated with excess chloramine. After filtration from the ca. 18 g. of ammonium chloride formed, the filtrate was evaporated to dryness and the residue extracted with ether to remove tars and unreacted Auramine. There was obtained 38.6 g. of 1,1-dimethyl-1-[4-(4-dimethylamino-alpha-iminobenzyl)phenyl]hydrazinium chloride melting 142–150° C. Treatment of small portions of the product with saturated aqueous solutions of picric acid and potassium hexafluorophosphate gave the corresponding hydrazinium picrate (M.P. 83–86° C.) and hexafluorophosphate (M.P. 128–132° C. with charring) respectively. The structural formula of the latter is shown below:

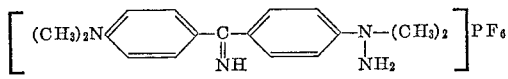

EXAMPLE V

A solution of 25 g. of p,p'-methylene-bis-(N,N-dimethylaniline) dissolved in 500 ml. of chloroform was treated with gaseous chloramine made from 19 g. of chlorine according to the general method of Example I. The residue obtained by evaporation of the filtrate (after removal of ammonium chloride) was carefully triturated with hot benzene. The yield of product after filtration was 16.5 g. The 1,1-dimethyl-1-[4-(4-dimethylaminobenzyl)phenyl] hydrazinium chloride thus obtained melted with decomposition at 195–197° C. and analyzed for 11.3% chloride ion or 97.5% pure. Treatment of a small portion of the product with aqueous picric acid gave the corresponding hydrazinium picrate melting 147–150° C. shown below:

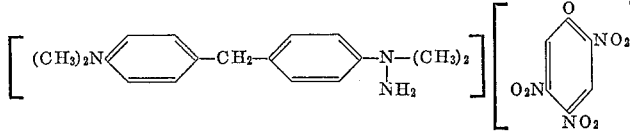

EXAMPLE VI

To a mixture of 6.6 g. of benzylidene-bis-(N,N-dimethylaniline), 50 ml. of methanol and 50 ml. of a saturated solution of sodium hydroxide in methanol, there was added 5.6 g. of hydroxylamine-o-sulfonic acid dissolved in 25 g. of the same solvent. After the initial vigorous reaction had subsided, the reaction mixture was heated for thirty minutes, filtered and the separated solids washed well with methanol. The combined filtrates and washings were evaporated to dryness and the residue taken up in a mixture of water and ether. After separation, the aqueous layer was treated with Norite and evaporated to dryness. The new residue was taken up in isopropyl alcohol and crystallized by the addition of ethyl acetate. There was obtained 2 g. (a 24% yield) of tri- phenylmethane - 4,4' - bis-(alpha,alpha-dimethylhydrazinium)sulfate having the formula shown:

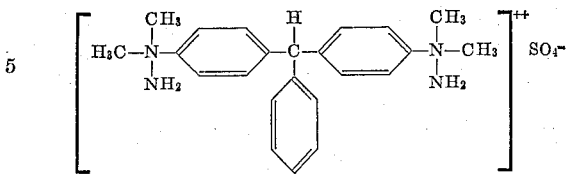

After recrystallization, the product melted 193–194° C. and had the following analysis: 11.76% N and 6.97% S. Calculated for $C_{23}H_{30}N_4SO_4$: 12.22% N and 6.99% S.

The corresponding chloroplatinate salt was prepared and analyzed. Found: 36.27% C; 4.17% H; 7.01% N; and 25.24% Pt. Calculated for $C_{23}H_{30}N_4PtCl_6$: 35.85% C; 3.92% H; 7.27% N; and 25.33% Pt.

In addition to illustrating the preparation of a hydrazinium sulfate, this example shows the formation of a dihydrazinium product by the use of excess hydroxylamine-o-sulfonic acid. Such di-N-amination reactions are general and will result when a compound containing a second tertiary-amino group is exposed to the action of excess N-aminating agent. This will more frequently occur with hydroxylamine-o-sulfonic acid than with chloramine because the initial hydrazinium chloride formed by the reaction of chloramine is usually insoluble in the hydrocarbon or hydrocarbon-like reaction medium. When hydroxylamine-o-sulfonic acid is used, both it and the hydrazinium sulfate formed are usually soluble in the alcohol solvent customarily employed favoring further N-amination.

EXAMPLE VII

The object of this example is to illustrate the bacteriostatic and fungistatic activity of some representative compounds of our invention. Each compound was tested for bacteriostatic activity against *Micrococcus pyrogenes* var. *aureus* and for fungistatic activity against *Canidida albicans, M. gypseum* and *Chaetomium globosum* by means of the Oxford cup method using Zephiran as the control. Each of the experimental compounds was prepared as a 0.1%, 0.01% and 0.001% weight/volume solution or suspension in distilled water. The pH was adjusted to 7.0 by the addition of dilute hydrochloric acid or sodium hydroxide. Flasks containing 100 ml. of the appropriate sterile melted medium were inoculated with 0.1 ml. of viable 18–24 hour broth cultures of the respective organism. After thorough mixing, 13 ml. quantities of the inoculated media were transferred aseptically to sterile Petri dishes and allowed to solidify, after which the plates were refrigerated overnight. Nutrient agar was used for the bacteria and Sabourand's dextrose or potato agar for the fungi. The following morning, three sterile stainless steel Oxford cups (10 mm. diameter) were placed equidistantly over the surface of the medium in each plate, after having been slightly warmed in the Bunsen flame. The plates containing the cups were refrigerated for approximately two hours to form a tight seal between cup and medium. Following refrigeration, the cups were filled approximately three-fourths full (0.7 ml.) with the various solutions to be tested. Each central and experimental solution was tested on duplicate plates on two different days, giving a total of four readings for each solution tested. The plates containing *C. albicans* and *M. pyrogenes* were incubated at 37° C. for 24 hours. The plates containing *M. gypseum* and *Ch. globosum* were incubated at room temperature (ca. 25° C.) for 3 or 4 days. At the end of the incubation period, the plates were carefully examined and the diameter of the zone of inhibition of microbial growth surrounding each cup was measured. A notation of the degree (complete or partial) of inhibition of growth was also made in the case of *C. albicans* and *M. gypseum*. The results obtained were averaged and a summary of the tests are tabulated below:

*Zone of Inhibition, a Measure of Bacteriostatic and Fungistatic Activity*

| Test material | Concentration | C. albicans | M. gypseum | Ch. globosum | M. pyrogenes |
|---|---|---|---|---|---|
| Zephiran (control) | 0.001 | 10 | 13 | 12 | 13 |
|  | 0.01 | 12 | 15 (p) | 20 | 19 |
|  | 0.1 | 17 | 26 | 28 | 23 |
| Hydrazinium chloride of Example I | 0.001 | 10 | 10 | 10 | 10 |
|  | 0.01 | 14 (p) | 10 | 11 | 11 |
|  | 0.1 | 14 | 14 (p) | 25 | 17 |
| Hydrazinium chloride of Example II | 0.001 | 12 | 10 | 10 | 10 |
|  | 0.01 | 21 | 26 (p) | 14 | 17 |
|  | 0.1 | 23 | 38 | 24 | 20 |

(p) indicates partial inhibition.

We claim:
1. Compounds having the formula

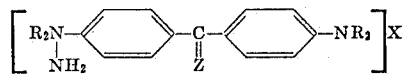

wherein =Z is a member selected from the group consisting of =H$_2$, =NH, and

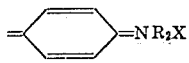

R is a lower-alkyl radical; and X is an anion.

2. 1,1 - dimethyl - 1 - [4 - (4 - dimethylaminobenzyl)phenyl]hydrazinium chloride.

3. 1,1 - dimethyl - 1 - [4-((alpha-(quinone-p-dimethylimonium) - 4 - dimethylaminobenzyl))phenyl]hydrazinium dichloride.

4. 1,1 - dimethyl - 1-[4-(4-dimethylamino-alpha-iminobenzyl)-phenyl]hydrazinium chloride.

References Cited in the file of this patent
UNITED STATES PATENTS
2,955,108    Omietanski _____ Oct. 4, 1960